United States Patent Office 3,580,907
Patented May 25, 1971

3,580,907
MORPHANTHRIDINE DERIVATIVES
Max Thiel and Kurt Stach, Mannheim, Wolfgang Schaumann, Mannheim-Waldhof, and Annemarie Ribbentrop, Mannheim, Germany, assignors to Boehringer Mannheim Gesellschaft mit beschrankter Haftung
No Drawing. Filed Jan. 24, 1967, Ser. No. 611,240
Claims priority, application Germany, Feb. 18, 1966,
B 85,866
Int. Cl. C07d *41/04, 41/06*
U.S. Cl. 260—239         16 Claims

ABSTRACT OF THE DISCLOSURE

Morphanthridine derivatives of the formula

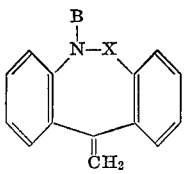

wherein B is H or the group —A—Am, wherein Am is a secondary amino group, A is a straight or branched chain alkylene group and X is a methylene or carbonyl group. The pharmacologically acceptable salts of the compounds wherein B is —A—Am are also within the scope of the invention as are the pharmaceutical compositions containing the latter compounds and the method of using the same. The morphanthridine derivatives possess psychodynamic properties, being particularly adapted for use as antidepressive agents.

---

The present invention relates to certain new morphanthridine derivatives, the preparation thereof and to a method of compounding and using the same.

The novel morphanthridine derivatives, according to the present invention, have the following structural formula:

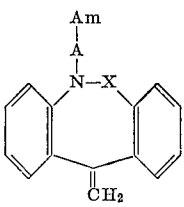

and the salts thereof, wherein Am is a secondary amino group, A is a straight or branched chain alkylene radical and X is a methylene or carbonyl group.

The secondary amino group designated above by the symbol Am includes dialkylamino groups, the alkyl radicals of which may also be joined together to form, together with the nitrogen atom to which they are attached, a heterocyclic radical. The radical Am includes such dialkylamino radicals as may have lower alkyl groups such as dimethylamino, diethylamino, dipropylamino, dibutylamino and the like, and may also represent such heterocyclic radicals as the piperidinyl, pyrrolidinyl, N-methyl piperazinyl and morpholinyl radicals.

The morphanthridine derivatives according to the present invention possess valuable psycho-pharmaceutical properties, and being particularly adapted for use as antidepressive agents.

The morphanthridine derivatives according to the present invention can be prepared by reacting a compound of the formula

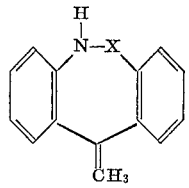

wherein X is as above defined, with a compound having the general formula

$$Y\text{—}A\text{—}Am \qquad (III)$$

wherein A and Am are as above defined, and Y is a reactive ester group.

An alternative method for preparing the morphanthridine derivatives comprises reacting a compound of the formula

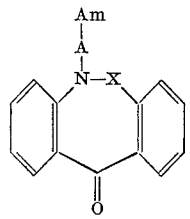

wherein A, X and Am have the same meanings as set out above, with a methyl magnesium halide, followed by dehydration by the conventional methods.

If desired, in those cases in which X represents a carbonyl group in the final reaction product, the carbonyl group can be reduced in the known manner. Furthermore, if desired, the products can also be converted into their salts by the conventional procedures.

The compounds of structural Formula II, which are used as starting materials for the preparation of the new compounds according to the present invention, are themselves also new compounds. They can be prepared by reacting the known 5,6-dihydro-morphanthridine-6,11-dione with a methyl magnesium halide to give 11-hydroxy-11-methyl-5,6-dihydro-morphanthridine-6-one, which is then dehydrated to give 11-methylene-5,6-dihydromorphanthridine-6-one and this then, if desired, reduced to 11-methylene-5,6-dihydro-morphanthridine.

The starting compounds of structural Formula IV can be prepared by reacting 5,6–dihydro-morphanthridine-6,11-dione or 5,6-dihydro-morphanthridine-11-one with a compound having the structural Formula III and, if desired, after the N-alkylation of the resulting 5,6-dihydromorphanthridine-6,11-dione, the 6-carbonyl group is selectively reduced. For this purpose, the 11-keto group is protected against attack from the reducing agent by means of acetalization and subsequently liberated by splitting off the protective group.

For carrying out the process according to the present invention, the compound II is reacted, preferably in an inert solvent, with the compound III in the presence of a strongly basic condensation agent. In general, there are preferably used the readily obtainable halides (Y=halogen). However, other esters, for example, those of the aromatic sulphonic acids (Y=tosyl, brosyl, etc.) are also suitable for use in the N-alkylation.

In the case of the process according to the present invention in which the compound IV is reacted with a methyl magnesium halide, it is not necessary to isolate the hydrolysis products so that the desired dehydration products can be obtained in one stage.

In those cases in which, as end products, compounds in which X is a methylene group are desired, those compounds II or IV are used as starting material which already possess this methylene group, or, alternatively the 6-carbonyl group is reduced in known manner to the methylene group. As reducing agents for this purpose, there are preferably used, the complex metal hydrides, most preferably lithium aluminium hydride.

The term "salts" as used herein is intended to include all nontoxic or pharmacologically acceptable salts of the basic compounds, including both the acid addition salts and the quaternary ammonium salts.

The organic bases of the foregoing type form salts with a variety of inorganic and strong organic acids including sulfuric, phosphoric, hydrochloric, hydrobromic, sulfamic, citric, oxalic, ascorbic and related acids. They also form quaternary ammonium salts.

The organic bases of the foregoing type form salts with a variety of inorganic and strong organic acids including sulfuric, phosphoric, hydrochloric, hydrobromic, sulfamic, citric, oxalic, ascorbic and related acids. They also form quaternary ammonium salts with a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide; phenethyl bromide, naphthylmethyl chloride, dimethyl sulfate, diethyl sulfate, methyl benzenesulfonate, ethyl toluenesulfonate, ethylene chlorohydrin, propylene chlorohydrin, allyl bromide, methallyl bromide and crotyl bromide.

The following example are given in order to more clearly disclose the nature of the present invention. It should be understood, however, that the examples are not intended to be a limitation on the scope of the invention:

EXAMPLE 1

5 - (2 - dimethylamino-ethyl)-11-methylene-5,6-dihydro-morphanthridine-6-one 3.3 g. sodium hydride were added to a solution of 12 g. 11-methylene-5,6-dihydro-morphanthridine-6-one in 120 ml. dioxane and the resulting mixture boiled for one hour. After cooling, 8.6 g. 2-dimethylaminoethyl chloride were added thereto and boiling continued for a further two hours. The dioxane was thereafter evaporated in a vacuum and the residue taken up in water and extracted with ether. The ethereal solution was extracted with 2N hydrochloric acid and the acidic extract again made alkaline and extracted with ether. The residue remaining after evaporation of the ethereal extract was dissolved in diethyl ketone and neutralized with ethereal hydrochloric acid. The initially grease-like precipitate became crystalline. There were obtained 11 g. (62% of theory) 5 - (2 - dimethylamino-ethyl)-11-methylene-5,6-dihydro-morphanthridine-6-one hydrochloride having a melting point of 205–207° C. The free base was prepared therefrom in the conventional manner and melted at 105–106° C.

The 11 - methylene-5,6-dihydro-morphanthridine-6-one used as starting material was prepared in the following manner: 400 ml. anhydrous tetrahydrofuran were added to a Grignard solution of 14.4 g. magnesium, 44 ml. methyl bromide and 200 ml. ether. 44 g. 5,6-dihydro-morphanthridine-6,11-dione were introduced into the resulting solution while controlling the temperature so that the same did not exceed 20° C. After decomposition of the reaction mixture with an aqueous solution of ammonium chloride, the organic phase was separated off and the aqueous solution again extracted with a mixture of tetrahydrofuran and ether. The combined extracts were evaporated, the residue triturated with ether and then filtered with suction. There were obtained 38 g. (80.5% of theory) 11 - hydroxy - 11 - methyl-5,6-dihydro-morphanthridine-6-one having a melting point of 179–180° C. 10 g. of this latter compound were heated for one hour at 140° C. with 20 g. pyridine hydrochloride. The melt was then poured into water, filtered off with suction, washed with water and dried. There were obtained 8.9 g. (95% of theory) 11-methylene-5,6-dihydromorphanthridine-6-one having a melting point of 209–211° C.

EXAMPLE 2

5 - (3 - dimethylamino-propyl) - 11 - methylene-5,6-dihydro-morphantridine-6-one By a procedure analogous to that described in Example 1, there were obtained from 16.8 g. 11-methylene-5,6-dihydro-morphanthridine-6-one, 150 ml. dioxan, 4.6 g. sodium amide and 13.7 g. 3-dimethylaminopropyl chloride, 12.5 g. (53% of theory) 5-(3-dimethylamino-propyl) - 11 - methylene - 5,6 - dihydro-morphanthridine-6-one hydrochloride having a melting point of 155–157° C.

EXAMPLE 3

5-(2-dimethylamino-ethyl)-11-methylene-5,6-dihydro-morphanthridine

A mixture of 43 g. 11-methylene-5,6-dihydro-morphanthridine, 130 ml. dioxan and 3.6 g. sodamide was heated to boiling for one hour. After cooling, 10.8 g. 2-dimethylaminoethyl chloride were added thereto and the reaction mixture boiled under reflux for a further two hours. Following evaporation of the dioxan in a vacuum, the residue was shaken with water and ether. The ethereal phase was extracted with 2 N hydrochloric acid. The acidic solution was rendered alkaline and extracted with ether. The residue remaining behind after evaporation of the ethereal extract was dissolved in isopropanol and mixed with 7.5 g. maleic acid in isopropanol. There were recovered 19 g. (76.5% of theory) 5-(2-dimethylamino-ethyl)-11-methylene-5,6-dihydro-morphanthridine maleate having a melting point of 166–167° C.

The 11-methylene-5,6-dihydro-morphanthridine used as starting material was prepared in the following manner: 18.6 g. 11 - methylene - 5,6 - dihydro-morphanthridine-6-one (see Example 1) were dissolved in 300 ml. tetrahydrofuran and 7.5 g. lithium aluminium hydride was added thereto portionwise. The reaction mixture was boiled under reflux for 4 hours, water then added thereto, filtered and washed with tetrahydrofuran. The combined filtrates were evaporated and the residue recrystallized from isopropanol. There were obtained 13 g. (75% of theory) 11-methylene-5,6-dihydro-morphanthridine having a melting point of 98–99° C.

EXAMPLE 4

5-(3-dimethylamino-propyl)-11-methylene-5,6-dihydro-morphanthridine

Variant I.—In a manner analogous to that described in Example 3, there were obtained from 15.2 g. 11-methylene-5,6-dihydro-morphanthridine, 150 ml. dioxan, 4.2 g. sodamide and 14.3 g. 3-dimethylamino-propyl chloride, 20.3 g. of an oily base from which the maleate was prepared in isopropanol. There were obtained 22.4 g. 5-(3-dimethylamino - propyl) - 11 - methylene-5,6-dihydro-morphanthridine maleate having a melting point of 158–160° C.

Variant II.—1.3 g. 5 - (3 - dimethylamino-propyl)-11-methylene - 5,6 - dihydro-morphanthridine-6-one (see Example 2) in 50 ml. ether were added dropwise to a slurry of 0.15 g. lithium aluminium hydride in 10 ml. ether. After boiling under reflux for two hours, the reaction mixture was decomposed with water, filtered with suction and washed with ether. The filtrate was evaporated and from the residue there was prepared the maleate in isopropanol. There were obtained 1.2 g. (69% of theory) 5-(3-dimethylamino-propyl)-11-methylene - 5,6-dihydro-morphanthridine maelate having a melting point of 158–160° C.

EXAMPLE 5

5-(3-piperidino-propyl)-11-methylene-5,6-dihydro-morphanthridine

A mixture of 15 g. 11-methylene-5,6-dihydro-morphanthridine (see Example 3), 150 ml. dioxan and 4.15 g. sodamide were boiled under reflux for one hour. 16.1 g. 3-piperidino-propyl chloride were then added thereto and boiling under reflux continued for a further two hours. The dioxan was then distilled off and the residue extracted with ether and water. The ethereal phase was extracted with 2 N hydrochloric acid. The acidic solution was rendered alkaline and extracted with ether. The residue remaining after evaporation of the ethereal extract was dissolved in ethanol and mixed with 18 g. cyclohexylamine-sulphonic acid in ethanol. Ether was added until cloudiness appeared and the whole then left to stand for a few hours in a refrigerator. The crystals which were obtained were again dissolved in alcohol and precipitated out with ether. There were obtained, in a yield of 30% of theory, 5-(3-piperidino-propyl)-11-methylene-5,6-dihydro-morphanthridine di-cyclohexylamine-sulphonate having a melting point of 128–130° C.

EXAMPLE 6

5-(2-piperidino-ethyl)-11-methylene-5,6-dihydro-morphanthridine-6-one

A mixture of 16.1 g. 11-methylene-5,6-dihydro-morphanthridine-6-one, 4.2 g. sodamide and 150 ml. dioxan were boiled under reflux for one hour and then mixed with 17.4 g. 1-(2-chloroethyl)-piperidine. The reaction mixture was then boiled under reflux for four hours, evaporated to dryness in a vacuum and the residue stirred with ether and hydrochloric acid. The acidic solution was rendered alkaline and extracted with ether. After drying over anhydrous potassium carbonate, the ethereal phase was evaporated and the residue dissolved in isopropanol. 7.5 g. maleic acid in isopropanol was added thereto and ether added until cloudiness appeared. After the addition of a further amount of ether, the crystals formed were filtered off with suction. There was obtained 24 g. (66% of theory) 5-(2-piperidinoethyl)-11-methylene-5,6-dihydro-morphanthridine-6-one maleate having a melting point of 116–118° C.

EXAMPLE 7

5-(3-piperidino-propyl)-11-methylene-5,6-dihydro-morphanthridine-6-one

In a manner analogous to that described in Example 6, there were obtained, using 19 g. 1-(3-chloropropyl)-piperidine in place of the 1-(2-chloroethyl)-piperidine, 23.6 g. (70%) of theory) 5-(3-piperidino-propyl)-11-methylene-5,6-dihydro-morphanthridine-6-one succinate having a melting point of 147–148° C.

EXAMPLE 8

5-[2-(4-methoxy-piperidino)-ethyl]-11-methylene-5,6-dihydro-morphanthridine-6-one In a manner analogous to that described in Example 6, there were obtained, with the use of 1-(2-chloroethyl)-4-methoxy-piperidine in place of the 1-(2-chloroethyl)-piperidine, 22.4 g. (77% of theory) 5-[2-(4-methoxy-piperidino)-ethyl]-11-methylene-5,6-dihydro-morphanthridine-6-one hydrochloride having a melting point of 201–203° C.

EXAMPLE 9

5-[3-(4-methoxy-piperidino)-propyl]-11-methylene-5,6-dihydro-morphanthridine-6-one In a manner analogous to that described in Example 6, there were obtained, using 1-(3-chloropropyl)-4-methoxy-piperidine instead of 1-(2-chloroethyl)-piperidine, 13.1 g. (36% of theory) 5-[3-(4-methoxy-piperidino)-propyl]-11-methylene-5,6-dihydro-morphanthridine-6-one succinate having a melting point of 112–114° C.

EXAMPLE 10

5-(2-piperidino-ethyl)-11-methylene-5,6-dihydro-morphanthridine

A mixture of 10 g. 11-methylene-5,6-dihydro-morphanthridine, 2.76 g. sodamide and 100 ml. dioxan was boiled under reflux for ca. one hour and then mixed with 11.4 g. 1-(2-chloroethyl)-piperidine. After boiling under reflux for two hours, the reaction mixture was evaporated in a vacuum and the residue then stirred with ether and dilute hydrochloric acid. The acidic solution was rendered alkaline and again extracted with ether. The ethereal extract was dried and evaporated and the residue dissolved in isopropanol and mixed with 5.7 g. maleic acid in isopropanol. The product was thereafter precipitated out with ether. There were obtained 16 g. (76% of theory) 5-(2-piperidinoethyl)-11-methylene-5,6-dihydro-morphanthridine maleate having a melting point of 162–164° C.

The reaction products, in accordance with the invention as in the case of the known psychoanaleptic agent Imipramine [N-(gamma-dimethylamino-propyl)-iminodibenzyl], is an antidepressant agent characterized by its mood ameliorating component. However, unlike the known compound, the compounds of the invention do not have a sedative or anticholinergic effect. The latter constitute undesirable side reaction, mitigating against use of the drug. Further, the compounds in accordance with the invention have a prolonged effectiveness, i.e., the duration of the antidepressive activity persists for a longer period of time than with comparable doses of Imipramine. This, coupled with the lower toxicity, results in the provision of compounds of a new type which lend themselves to clinical application. Their administration results in achieving the desired antidepressive effect with similar dose levels, and without needless suffering on the part of the patient due to such side effects as undesired sedation and anticholinergic manifestation, i.e., sleepiness and dryness of the mouth.

One of the aspects of teh invention is to provide compositions containing the morphanthridine derivatives in accordance with the composition for use in the treatment of depressive states, particularly schizophrenia, especially with depressive manifestations. According to the invention, the morphanthridine derivatives may be associated with a carrier which may be either a solid material, or, a sterile parenteral liquid. The compositions may take the form of tablets, powders, capsules or other dosage forms which are suitable for oral ingestion. The diluents are employed in sterile condition for parenteral use, i.e., by injection. Such a medium may be a sterile solvent such as water. The compositions may take the form of active material, namely, the morphandthridine derivative admixed with solid diluents and/or tableting adjuvants, such as cornstarch, lactose, talc, stearate, gums, and the like. Any of the tableting materials used in pharmaceutical practice may be employed where there is no incompatibility with the morphanthridine derivative constituting the active agent. Alternatively, the morphanthridine derivative with its adjuvant material may be applied in the usual capsule or resorbable material, such as the usual gelatin capsule and administered in that form.

The percentage of active ingredients in the composition may be varied. It is necessary only that the active ingredient constitute a portion so that a suitable dosage will be obtained. Obviously several unit forms may be administered at about the same time. The oral dosage preferably falls between 25 and 250 mg. per day intramuscularly, or, intravenously, 10 to 75 mg. per day can be given. It must be appreciated, however, that the dosage should be individualized in accordance with the physician's experience and observations.

We claim:
1. A compound selected from the group consisting of:
(1) a compound having the formula

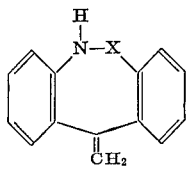

(2)

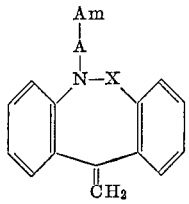

and (3) the nontoxic, therapeutically acceptable acid addition and quaternary ammonium salts of (2), wherein X is a member selected from the group consisting of methylene and carbonyl, A is lower alkylene having at least two carbon atoms separating the two nitrogen atoms to which it is attached and Am is di- lower alkylamino, piperidinyl, methoxy-piperidinyl, pyrrolidinyl, N-methyl piperazinyl and morpholinyl.

2. A compound according to claim 1 having the formula

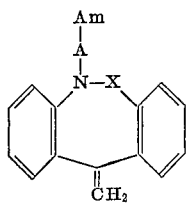

wherein X, A, and Am are as defined in claim 1.

3. A compound according to claim 2 designated 5-(2-dimethylamino - ethyl) - 11 - methylene - 5,6 - dihydro-morphanthridine-6-one.

4. A compound according to claim 2 designated 5-(3-dimethylamino - propyl) - 11 - methylene - 5,6 - dihydro-morphanthridine-6-one.

5. A compound according to claim 2 designated 5-(2-dimethylamino - ethyl) - 11 - methylene - 5,6 - dihydro-morphanthridine.

6. A compound according to claim 2 designated 5-(3-dimethylamino - propyl) - 11 - methylene - 5,6 - dihydro-morphanthridine.

7. A compound according to claim 2 designated 5-(3-piperidino-propyl) - 11 - methylene-5,6-dihydro-morphanthridine.

8. A compound according to claim 2 designated 5-(2-piperidino-ethyl) - -11 - methylene-5,6-dihydro-morphanthridine-6-one.

9. A compound according to claim 2 designated 5-(3-piperidino-propyl) - 11 - methylene-5,6-dihydro-morphanthridine-6-one.

10. A compound according to claim 2 designated 5-[2-(4 - methoxy - piperidino) - ethyl] - 11 - methylene-5,6-dihydro-morphanthridine-6-one.

11. A compound according to claim 2 designated 5-[3-(4 - methoxy - piperidino) - propyl] - 11 - methylene-5,6-dihydro-morphanthridine-6-one.

12. A compound according to claim 2 designated 5-(2-piperidino-ethyl) - 11 - methylene-5,6-dihydro-morphanthridine.

13. A compound according to claim 2 wherein A is alkylene having two carbon atoms.

14. A compound according to claim 2 wherein A is alkylene having three carbon atoms.

15. A compound according to claim 2 wherein Am is di-lower alkylamino.

16. A compound according to claim 2 wherein Am is piperidinyl or methoxy-piperidinyl.

References Cited
UNITED STATES PATENTS
3,391,136   7/1968   Berg _____ 260—239

ALTON D. ROLLINS, Primary Examiner

U.S. Cl. X.R.

260—239,3, 247.1, 247.5, 268, 293, 293.4, 294, 326.3, 326.81; 424—244, 248, 250, 267, 274